Nov. 16, 1926.

J. D. TRAMMELL

CONCRETE PIPE

Filed Oct. 9, 1925

Inventor
Jefferson D. Trammell
By Greene & Greene
Attorneys

Nov. 16, 1926.
J. D. TRAMMELL
CONCRETE PIPE
Filed Oct. 9, 1925
1,607,415
2 Sheets-Sheet 2
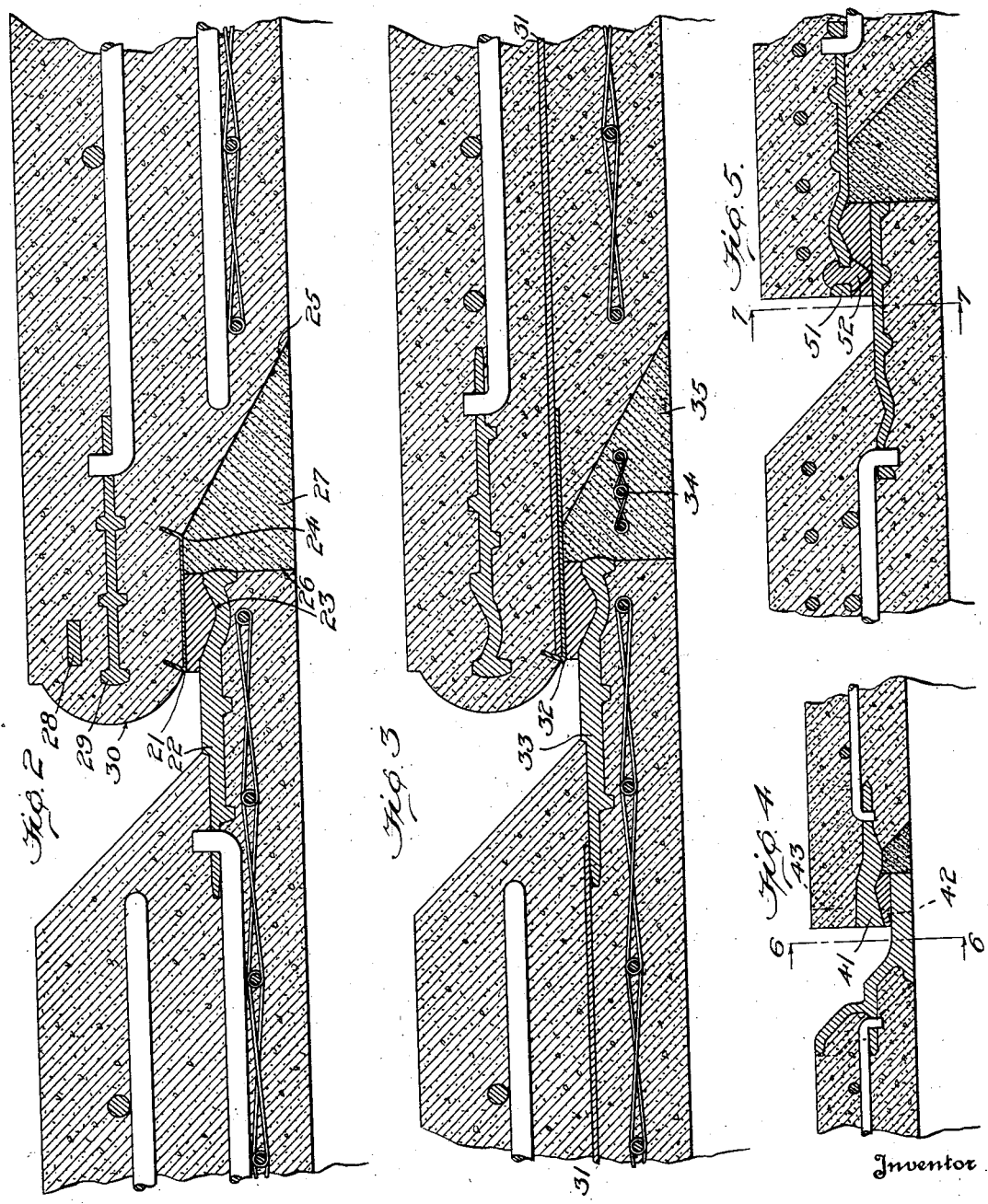
Inventor
Jefferson D. Trammell
By Greene & Greene
Attorneys

UNITED STATES PATENT OFFICE.

JEFFERSON D. TRAMMELL, OF FORT WORTH, TEXAS.

CONCRETE PIPE.

Application filed October 9, 1925. Serial No. 61,620.

My invention relates to the construction of reinforced concrete pipes and a method of sealing the joints of the same.

Because concrete pipes are subject to expansion and contraction due both to temperature changes and to variations in absorbed moisture, these longitudinal stresses should be taken up by some form of expansion joint which will not only avoid rupture of the pipe, but also remain fluid tight. Expansion joints also allow for adjustments which may be made necessary by the uneven settling of pipes carrying fluid under pressure and avoid such injury to the pipes as occurs when pipes are laid with rigid joints to form continuous longitudinally rigid cylinders.

My invention provides a slip joint of the bell and spigot type which, for concrete pipes combines the advantages of the cast lead joints commonly used in cast iron water and gas pipes with the added advantage of an initial calking of the cast joint from the interior of the pipe.

My invention further provides against the ends of the pipe sections coming into actual abuttal. After subsidence and deflections have taken place under operating conditions with respect to temperature and moisture, the pipe is completed by the addition of an independent externally coned sealing ring.

In the accompanying drawings:

Fig. 2 is an enlarged partial axial section of a modified form.

Fig. 3 is an enlarged partial axial section of a modified form.

Fig. 4 is a partial axial section of a form having centering lugs.

Fig. 5 is a partial axial section of a form using rivets for centering lugs.

Figure 1:
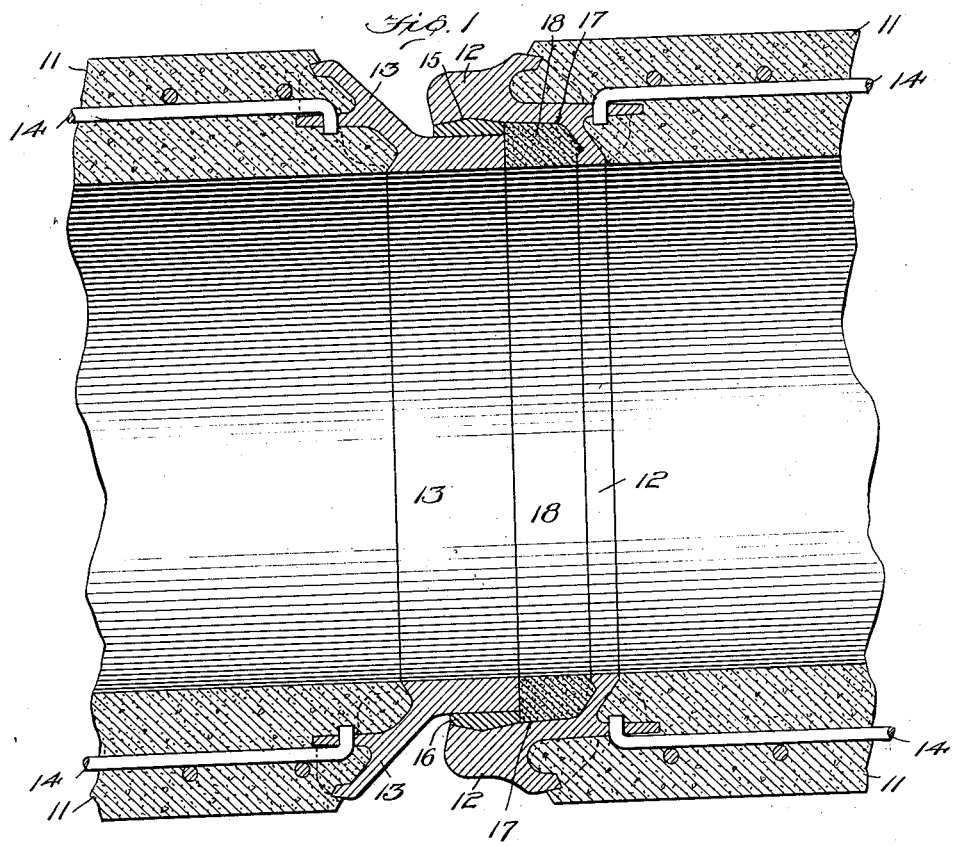
Fig. 1 is an axial section of one form of my joint showing connected pipes.

In these figures, 11 represents the body of a pipe section, 12 a cast metal ring forming a bell and 13 a companion cast metal ring forming a spigot. Longitudinal reinforcing bars 14 enter radial recesses in the bell and spigot castings 12 and 13 and serve to transmit longitudinal tension strains while the rigs and concrete interlock to resist relative radial movement.

Within the bell 12 is a shallow annular groove 15 deepest in its midsection and tapering in opposite directions towards the axis of the pipe, to receive a ring 16 of cast lead or the like and hold it against longitudinal slipping.

To permit calking the packing ring 16 from the interior of the pipe there is provided an annular recess 17 within the bell 12. After the interior calking is completed the recess 17 is filled with concrete 18 forming a ring of the same internal diameter as the pipe.

In Figure 2 a smooth cylindrical metal ring 21 forms a lining for a bell and a substantially cylindrical ring 22 having a shallow external groove forms a facing for a spigot for an adjoining pipe section. In this form the pipe ends are shaped to leave an internal annular recess 24 with heavily painted walls 25 and 26 to permit a ring 27 of concrete to yield slightly when the pipe sections are subjected to longitudinal stresses. The bell is reinforced by the metal rings 28 and 29 and is rounded at 30 to permit access to the joint.

In the form shown in Figure 3 there is a thin metal cylinder 31 embedded in the pipe to prevent fluid seeping through the pipe while the bell and spigot forming rings 32, 33 are slightly modified and an independent reinforcement 34 is added to filling ring 35.

Figure 6:
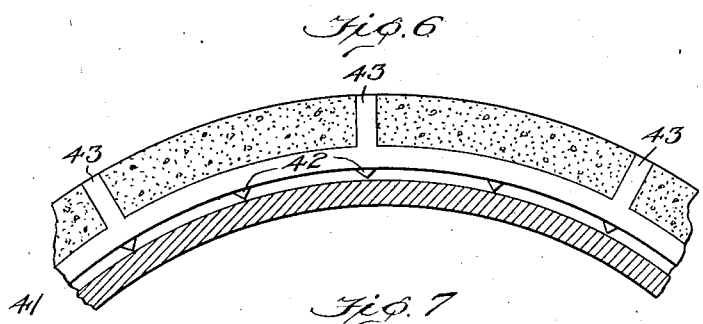
Fig. 6 is a partial cross-section on the line 6—6 of Fig. 4, the packing ring being omitted.

In Figures 4 and 6 the bell forming ring 41 has integral centering lugs 42 and 43, the former for centering the spigot within the hub and the latter to center the ring when being cast and subsequently to reinforce the bell end.

Figure 7:
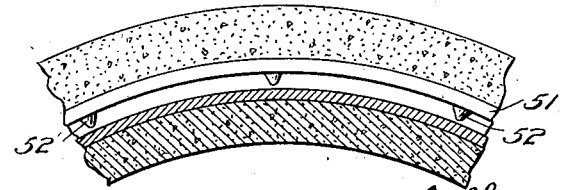
Fig. 7 is a partial cross-section on the line 7—7 of Fig. 5, without the packing.

In Figures 5 and 7 the bell facing ring 51 carries rivets 52 for centering the spigot within the bell.

The pipe sections having been placed and properly aligned in a trench, the lead ring 16 is cast with the aid of clay or other suitable means for temporarily confining the hot metal ring while it hardens. This clay being removed, the lead ring is carefully calked from the interior of the pipe where it is easily accessible. This both forces the lead outwardly against the bell and spigot as well as against the tapering abutment on the opposite side of the ring. This seals the joints against seepage of water from the exterior.

After this the trench may be back-filled, and if practical also flooded to hasten the subsidence of the fill. Filling the pipe with water will add to its weight and bring about substantially operating temperature and moisture conditions. When nearly ready for actual service, the pipe will be emptied and recalked from the inside to repair any injury due to initial adjustments and the concrete ring 18 is cast. By avoiding abutting concrete cylinders at the joints and permitting the telescoping and reasonable deflections of the pipes where joined such stresses as often facture concrete pipes after laying merely result in slight relative adjustments without injury to my pipe. Obviously the grooves for the packing may be formed either on the spigot or in the bell and the centering lugs may serve for holding the lead rings when calked. In the event of the accidental leakage of one of my joints while in service, it is only necessary to uncover the joint and re-calk it from the exterior without stopping the flow of water through the pipes. My invention does not require the use of special sealing gaskets or calking tools.

What I claim is:

1. A fluid conduit having telescoping expansion joints, each joint having one cylindrical smooth member, a spaced companion member having interlocking means for securing a calking ring against relative movement with respect to said member, and a ring of calking material between said spaced members with both ends exposed for calking.

2. A reinforced concrete pipe having a metal faced bell member, a metal faced spigot member of smaller diameter than said bell member, one of said facings being cylindrical and smooth and the other facing being provided with an annular groove converging oppositely from a substantially medial section, said pipe being internally and externally tapered adjacent to its bell and spigot ends, respectively.

3. A concrete pipe joint comprising a metal faced bell member, a metal faced spigot member, one of said facings being cylindrical and smooth, the companion facing converging oppositely towards said cylindrical facing from a substantially medial transverse section and a ring of calking material between said facings initially exposed at its opposite ends for compacting from within and without said pipe.

4. A concrete pipe joint comprising a metal faced bell member, a metal faced spigot member, one of said facings being cylindrical and smooth, a plurality of centering lugs extending from one of the facings to engage the companion facing, and a ring of calking material between said facings surrounding said lugs and initially exposed at opposite ends for compacting from within and without said pipe.

5. A pipe having a bell member, a spigot member of smaller diameter than said bell member, one of said members being cylindrical and smooth, the other member having interlocking means for securing a calking ring, said pipe being so shaped adjacent to its ends as to afford access to the opposite ends of a ring of calking material within said bell.

6. A conduit of pre-cast sections having telescoping joints of the bell and spigot type initially not in abuttal at any point, one telescoping member being cylindrical straight and smooth axially, the companion member being provided with an annular recess having oppositely faced truncated conical margins, an interposed sealing ring filling said annular recess and a space between said telescoping members, said sealing being accessible from both ends to permit calking from the exterior and interior of the conduit.

7. A concrete pipe joint comprising a metal faced bell member, and a metal faced spigot member of smaller diameter concentrically telescoped within the bell member initially not in abuttal at any point, one member of said facings having a cylindrical and smooth section, the radially opposite companion facing oppositely converging towards said cylindrical facing from a substantially medial transverse section, and a ring of calking material bearing between said facings, interlocked with the oppositely converging facing only, and free to slip upon the smooth cylindrical section, initially exposed at its opposite inner and outer ends, for compacting either from within or from without said pipe.

8. A concrete pipe joint comprising a metal faced bell member, a metal faced spigot member, of smaller diameter telescoped concentrically within the bell member and spaced apart radially and not in abuttal, one of said facings having a cylindrical, smooth and straight section axially, the other facing containing an annular groove opposite said cylindrical, smooth, straight section, and a pluarlity of centering lugs extending from the grooved facing to engage the cylindrical facing and a ring of calking material between said facings surrounding the lugs and interlocked therewith but free to slip upon the cylindrical facing and initially exposed at its opposite inner and outer ends, for compacting either from within or from without said pipe.

9. In a concrete pipe joint, the combination with spaced companion metal facings for bell and spigot ends, one of said facings being provided with an external annular groove, the companion facing being smooth and cylindrical, the pipe surfaces being externally and internally tapered adjacent to said metal facings, and heavily painted on the internally tapered portion.

In testimony whereof I hereunto affix my signature.

JEFFERSON D. TRAMMELL.